US008800156B2

(12) United States Patent
Sullivan et al.

(10) Patent No.: US 8,800,156 B2
(45) Date of Patent: Aug. 12, 2014

(54) MEASUREMENT APPARATUS AND USE THEREOF

(75) Inventors: Terry Sullivan, Tottenham (CA); Ryan Breedon, New Lowell (CA)

(73) Assignee: Honda Motor Co., Ltd., Tokyo (JP)

(*) Notice: Subject to any disclaimer, the term of this patent is extended or adjusted under 35 U.S.C. 154(b) by 229 days.

(21) Appl. No.: 13/422,147

(22) Filed: Mar. 16, 2012

(65) Prior Publication Data

US 2013/0239426 A1 Sep. 19, 2013

(51) Int. Cl.
*G01B 5/20* (2006.01)
*G01B 5/00* (2006.01)
*G01B 5/207* (2006.01)

(52) U.S. Cl.
CPC ............ *G01B 5/0025* (2013.01); *G01B 5/0002* (2013.01); *G01B 5/207* (2013.01)
USPC ............................................ 33/608; 33/1 BB

(58) Field of Classification Search
CPC ..... G01B 5/0025; G01B 5/207; G01B 5/0002
USPC .......... 33/608, 1 BB, 501.05, 501.08, 501.09, 33/501.1, 501.3, 501.45
See application file for complete search history.

(56) References Cited

U.S. PATENT DOCUMENTS

| 2,319,569 | A | | 5/1943 | White | |
|---|---|---|---|---|---|
| 2,958,951 | A | * | 11/1960 | Altson | 33/501.05 |
| 4,442,608 | A | * | 4/1984 | Clausen | 33/288 |
| 4,939,848 | A | * | 7/1990 | Armstrong | 33/608 |
| 5,343,628 | A | * | 9/1994 | Ham | 33/608 |
| 5,408,755 | A | * | 4/1995 | Russell | 33/608 |
| 5,507,101 | A | * | 4/1996 | Mason | 33/608 |
| 5,515,613 | A | * | 5/1996 | Hinson | 33/288 |
| 5,522,145 | A | * | 6/1996 | Chisum | 33/288 |
| 6,490,804 | B1 | | 12/2002 | Colson | |
| 6,769,192 | B2 | * | 8/2004 | Johansson et al. | 33/608 |
| 7,073,267 | B2 | * | 7/2006 | Butler et al. | 33/203 |
| 7,275,335 | B2 | * | 10/2007 | Holec et al. | 33/784 |
| 7,384,081 | B2 | | 6/2008 | Shishikura | |
| 7,707,737 | B2 | * | 5/2010 | Lightfoot | 33/700 |
| 8,266,811 | B2 | * | 9/2012 | Rivest | 33/608 |

FOREIGN PATENT DOCUMENTS

| JP | 20100166698 | 7/2010 |
|---|---|---|
| KR | 100679264 | 2/2007 |

* cited by examiner

*Primary Examiner* — Christopher Fulton
(74) *Attorney, Agent, or Firm* — Rankin, Hill & Clark LLP

(57) ABSTRACT

Described are various embodiments of an apparatus for evaluating the inner dimension of an opening within a body surface, for example, in the context of an assembly wherein one or more components are to be installed within a receiving body in which this opening is defined.

9 Claims, 7 Drawing Sheets

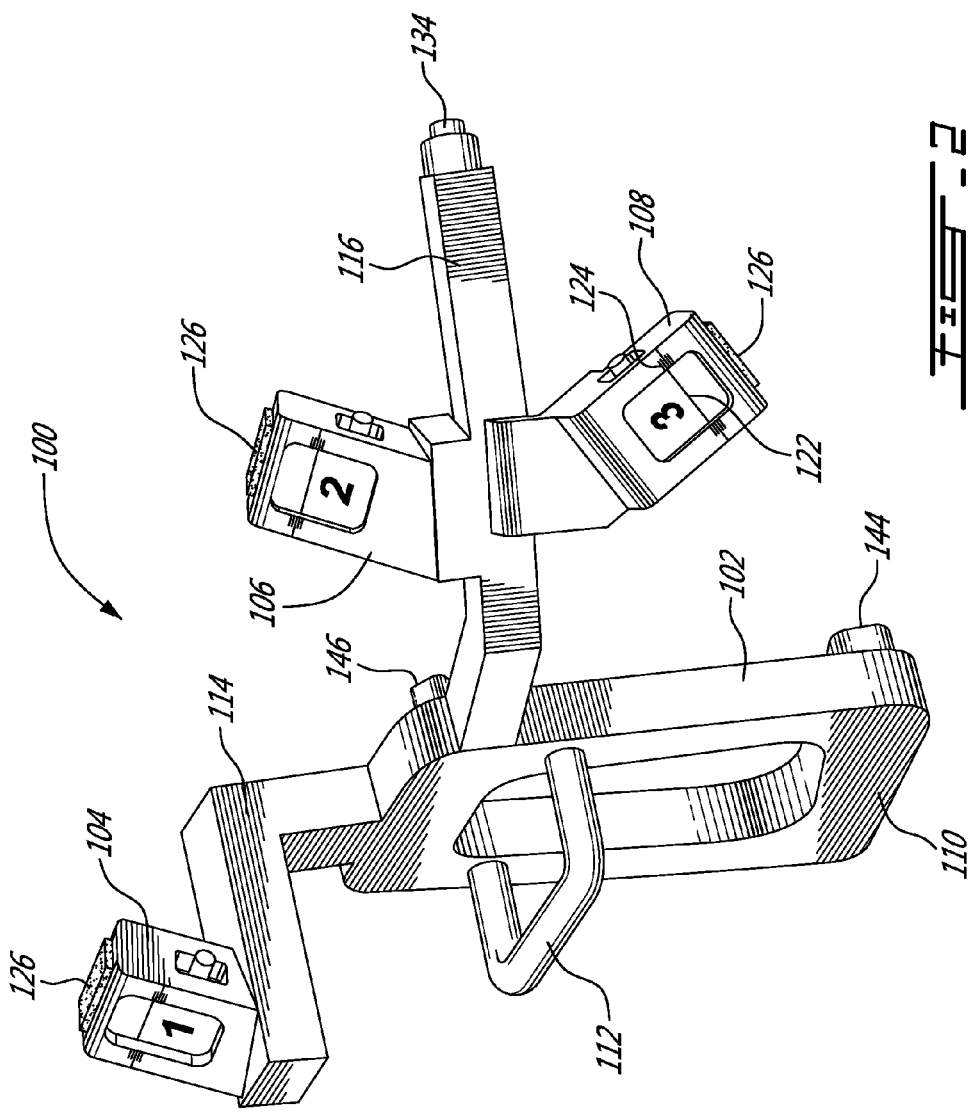

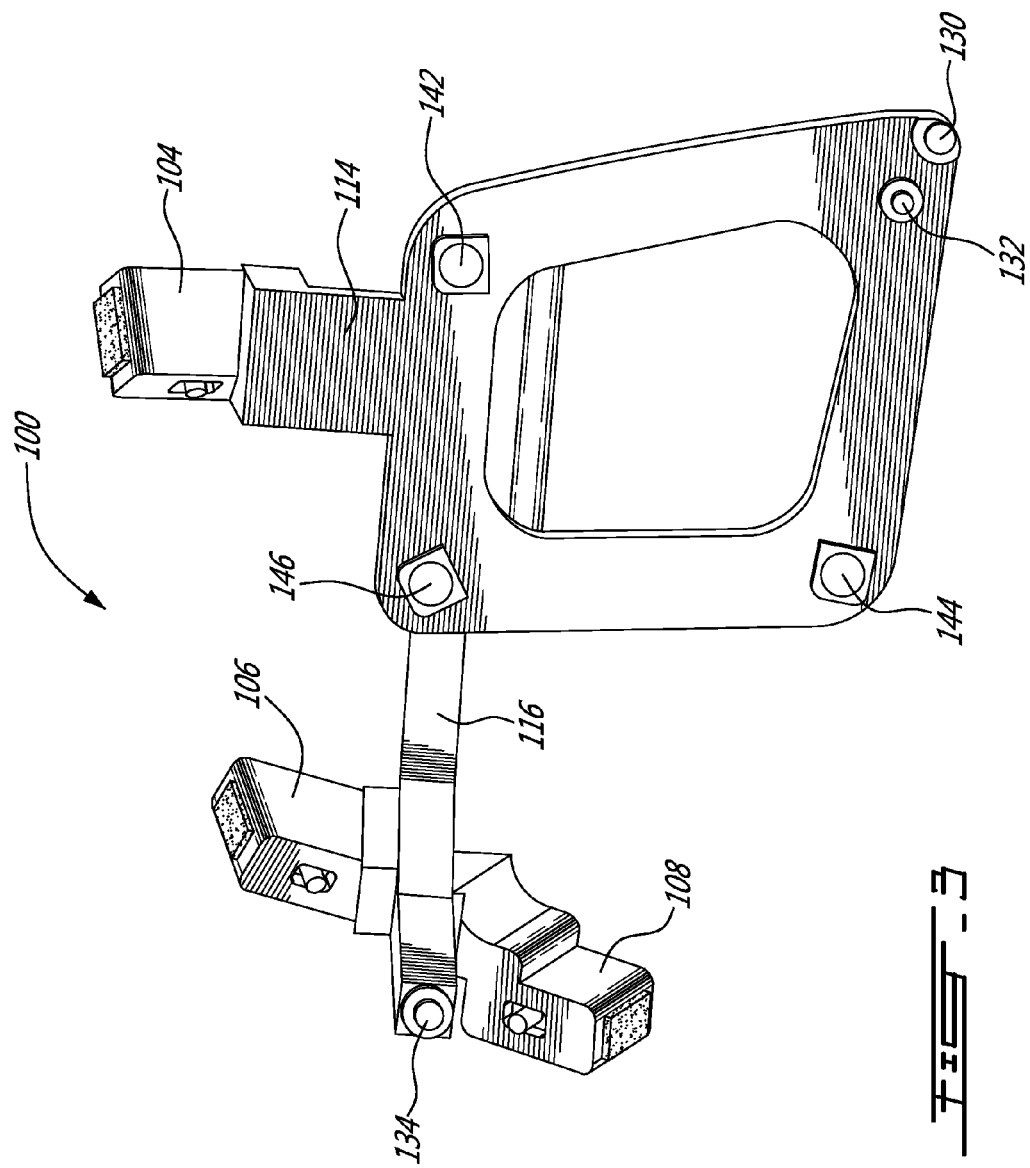

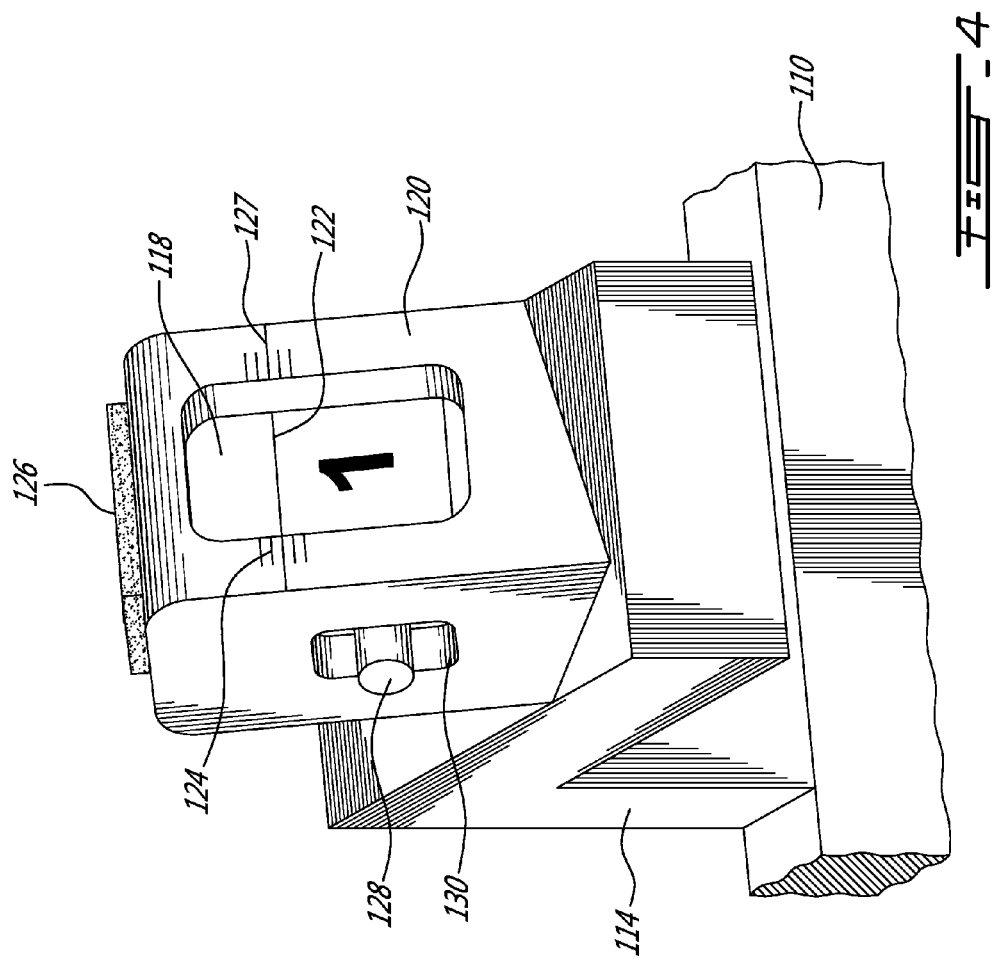

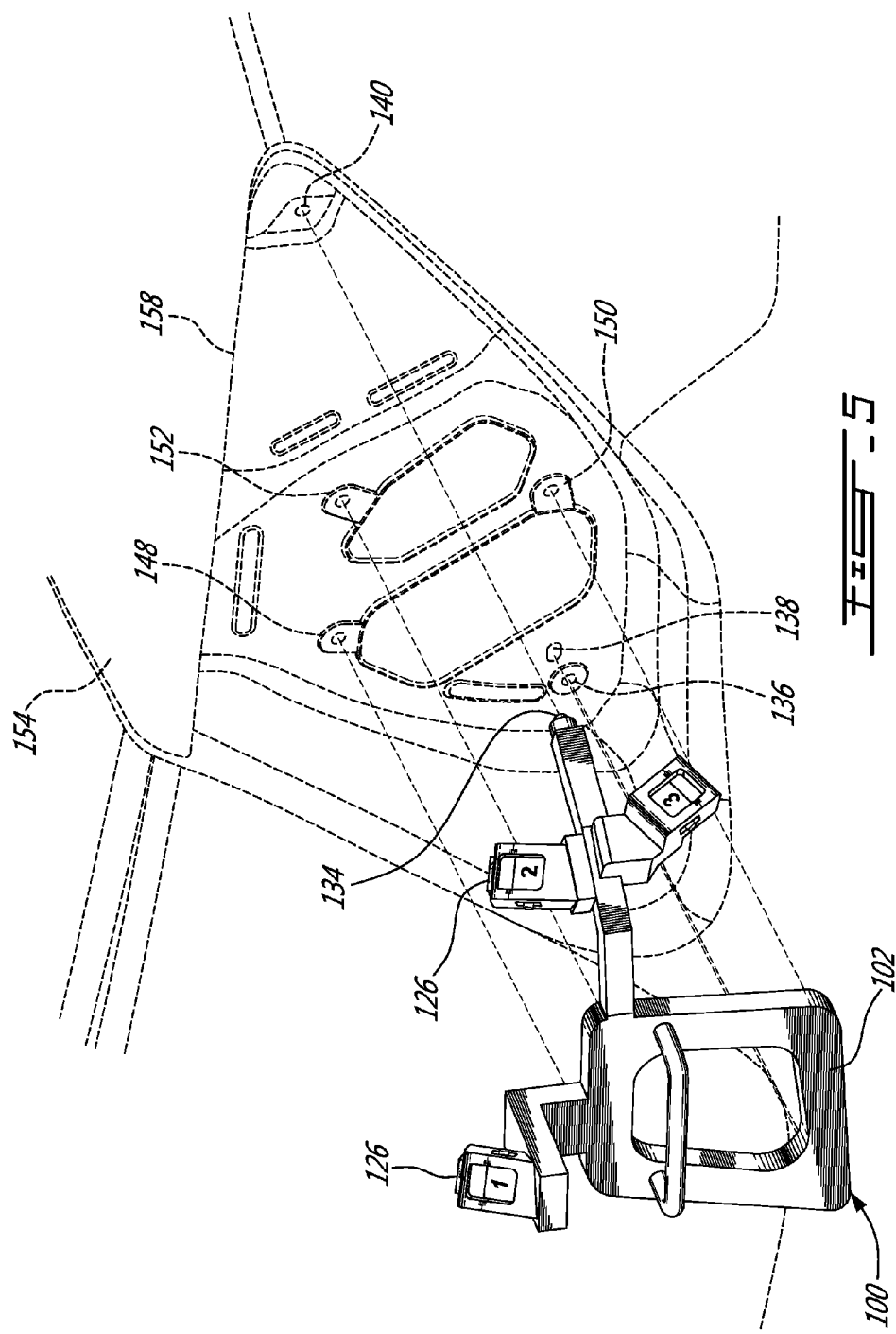

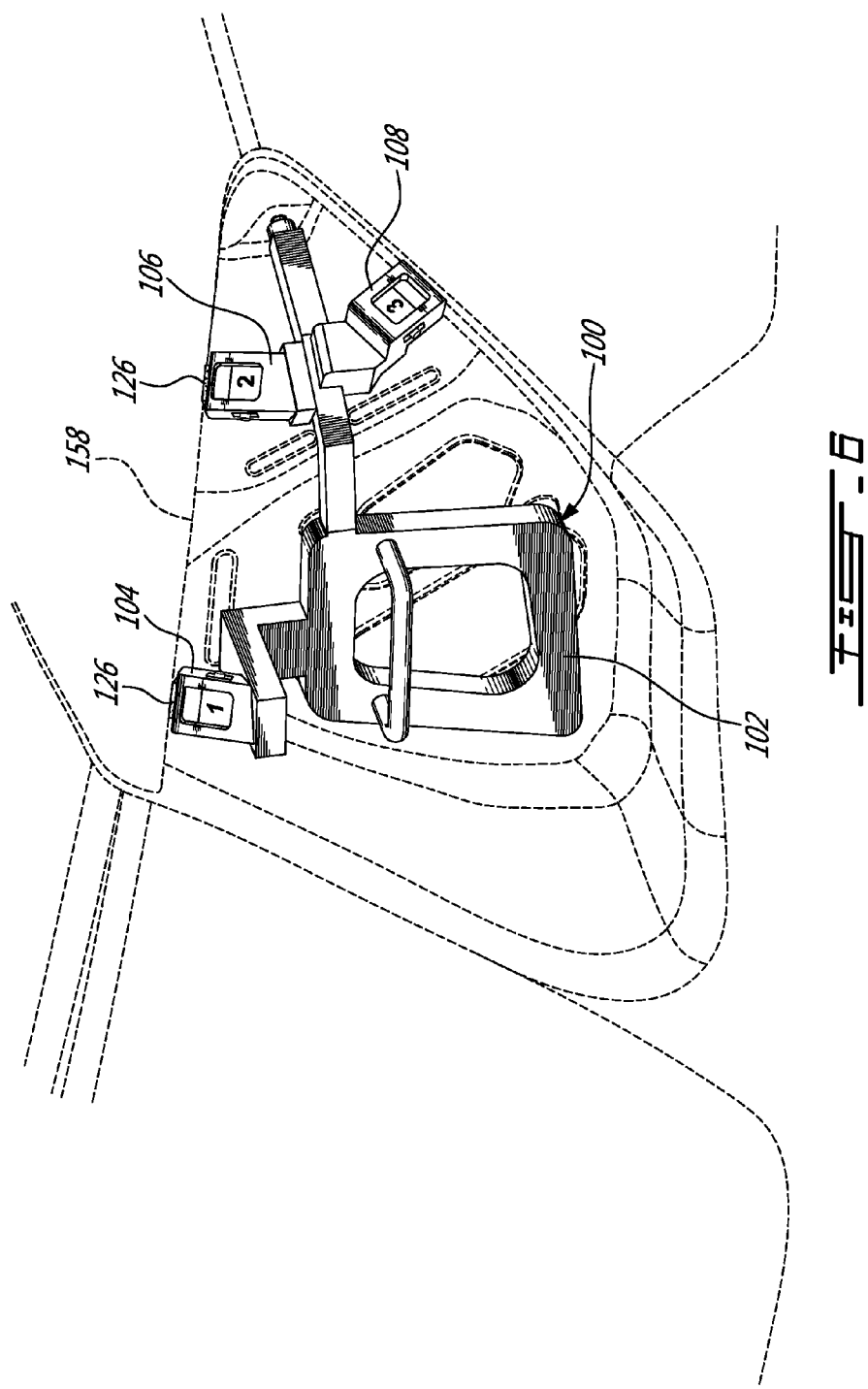

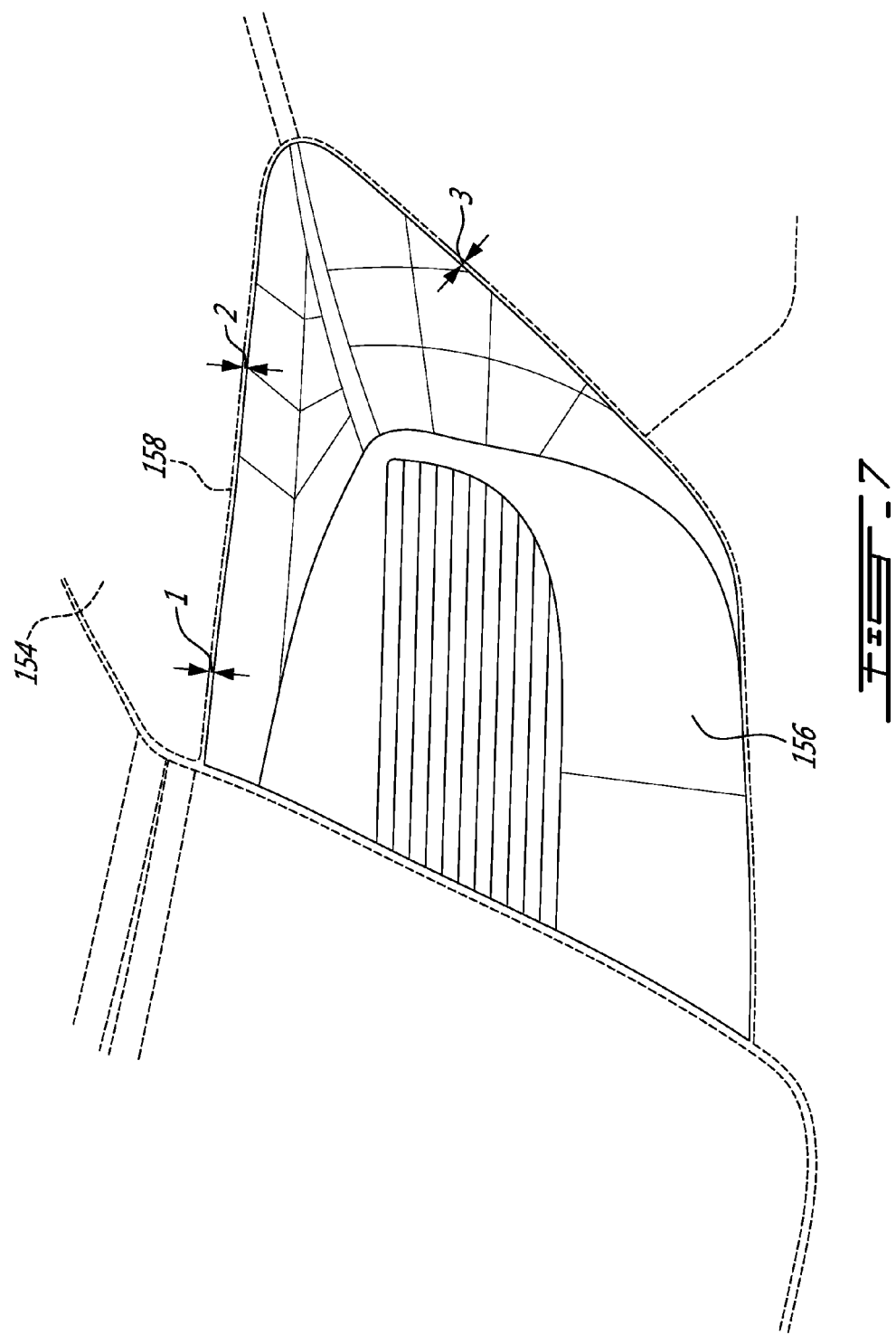

MEASUREMENT APPARATUS AND USE THEREOF

FIELD OF THE DISCLOSURE

The present disclosure relates generally to tools, and in particular, to a measurement apparatus and use thereof.

BACKGROUND

Various generic handheld measurement tools or gauges are generally known in the art to provide an indication as to the relative distance between points or components of an assembly, or again to ascertain a dimension, shape or size of a given product feature or component. While reasonably convenient in certain situations, use of such generic tools can prove cumbersome and inefficient in other contexts, particularly where reproducible and/or accurate measurements are not readily achievable given, for example, limited or reduced accessibility and/or visibility, or again where user-dependent measurement variability is commonly identified.

An example of one such application is in the evaluation of an inner dimension of an opening, for example formed within a body surface. Such evaluations may have applications, for example, in the manufacturing industry where one or more components are to be assembled within a receiving body, and where manufacturing designs or requirements dictate a given gap tolerance between the component(s) and receiving body, or again, prescribe that such gap measurements be minimized and/or otherwise controlled. Currently, gap measurements of this type are generally achieved post-installation using handheld tools with limited ease or reproducibility. Similarly, reproducing reliable measurements for an opening dimension using such handheld tools, particularly in the context of irregular openings and/or those formed within irregular surfaces (e.g. non-planar surfaces), can be particularly difficult and cumbersome.

In the manufacturing industry, customized measurement tools have been proposed to guide the fabrication process of various non-uniform components, for example as described in U.S. Pat. No. 2,319,569; to confirm sufficient freedom between co-located components in a confined space, such as described in Japanese Patent Application Publication No. 2010166698; or again to ascertain a non-uniform gap distance between substantially coplanar surfaces, as described in Korean Patent No. 679264. U.S. Pat. No. 6,490,804, on the other hand, describes a handheld gauge for measuring the shaft and flange mount of a starter for comparative purposes in providing replacement parts.

While the above provide different examples of application-specific measurement tools, these solutions are not readily amenable to different situations and therefore, provide limited utility where application specifics differ from that originally intended by the tool design. Further, none of these tools provide a particularly attractive solution for the evaluation of a dimension of an opening, or for the evaluation of a gap defined between a component and a receiving body in which it is to be installed.

Therefore, there remains a need for a measurement apparatus that overcomes some of the drawbacks of known apparatus, or at least, provides the public with a useful alternative.

This background information is provided to reveal information believed by the applicant to be of possible relevance to the present invention. No admission is necessarily intended, nor should be construed, that any of the preceding information constitutes prior art against the present invention.

SUMMARY

An object of the invention is to provide a measurement apparatus that overcomes some of the drawbacks of known apparatus, or at least, provides the public with a useful alternative. In accordance with one embodiment of the invention, there is provided an apparatus for evaluating an inner dimension of an opening defined within a body surface by a peripheral edge at least partially circumscribing the opening, the apparatus comprising: a base configured for reproducible positioning within the opening; and one or more extendable structures adjustably extendable from said base to engage the peripheral edge; wherein adjustment of said one or more structures provides an indication as to the inner dimension.

In accordance with another embodiment, there is provided an apparatus for evaluating an expected fit of a component prior to installation thereof within a correspondingly shaped receiving body, the apparatus comprising: a base structure configured for reproducible positioning within the receiving body; and two or more extendable structures adjustably extendable from said base in different directions so to engage corresponding portions of the receiving body; wherein adjustment of said extendable structures provides indication as to the expected fit.

Other aims, objects, advantages and features of the invention will become more apparent upon reading of the following non-restrictive description of specific embodiments thereof, given by way of example only with reference to the accompanying drawings.

BRIEF DESCRIPTION OF THE FIGURES

Several embodiments of the present disclosure will be provided, by way of examples only, with reference to the appended drawings, wherein:

FIG. 2 is a side perspective view of the apparatus of FIG. 1;

FIG. 3 is a rear perspective view of the apparatus of FIG. 1;

FIG. 4 is a perspective view of an extendable component of the apparatus of FIG. 1 for providing an indication of the dimension of the opening, in accordance with one embodiment of the invention;

FIG. 5 is a perspective view of the apparatus of FIG. 1 showing alignment thereof with an opening defined within a receiving body, in accordance with one embodiment of the invention;

FIG. 6 is a perspective view of the apparatus of FIG. 1 once positioned within the opening defined within the receiving body of FIG. 5; and FIG. 7 is a perspective view of a component installed within the opening defined within the receiving body of FIG. 5, showing respective gaps indicative of a fit thereof and predictable prior to installation by use of the apparatus of FIG. 1, in accordance with one embodiment of the invention.

DETAILED DESCRIPTION

Figure 1:
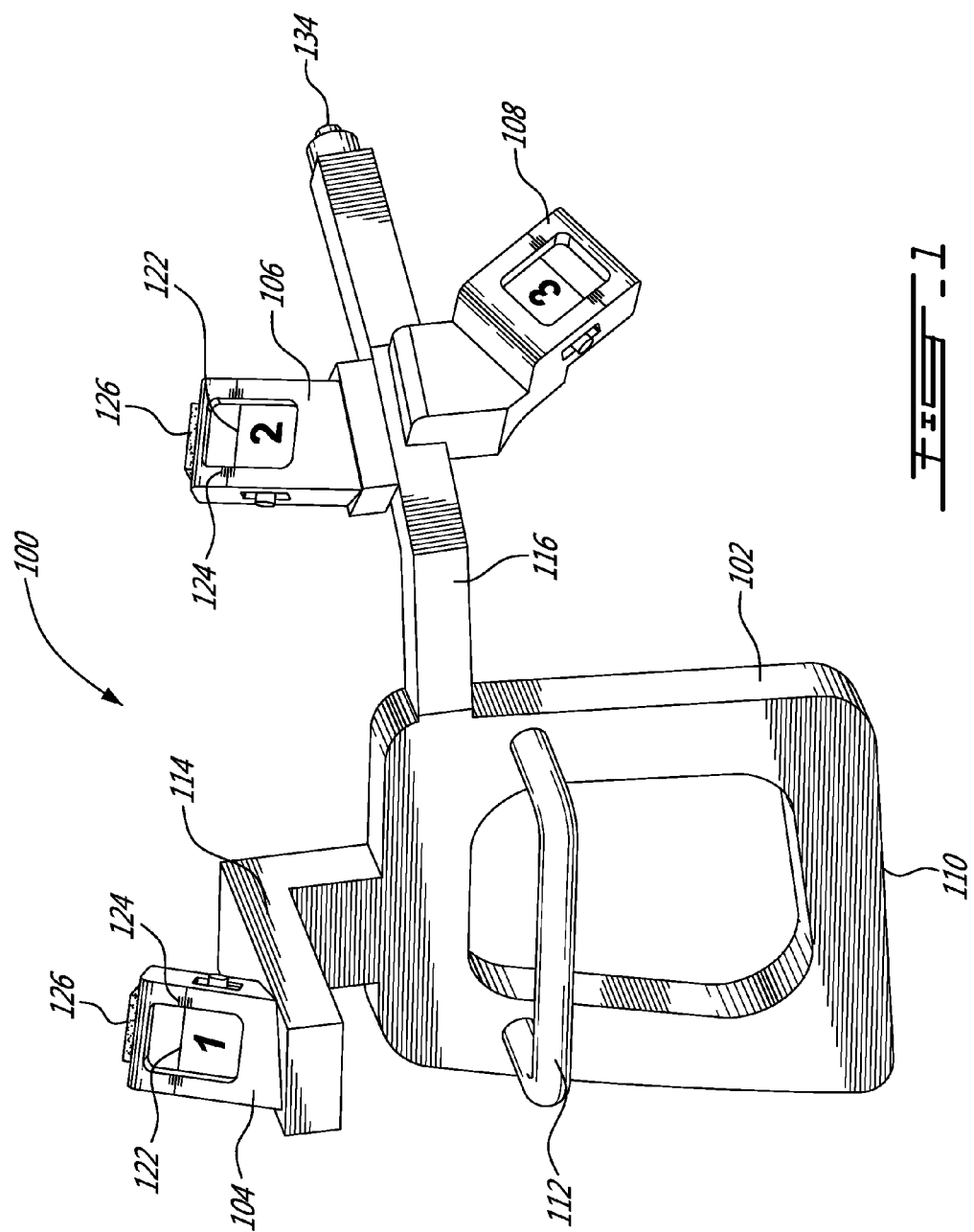
FIG. 1 is a front perspective view of an apparatus for evaluating a dimension of an opening formed within a body surface, in accordance with one embodiment of the invention.

With reference to the disclosure herein and the appended figures, a measurement apparatus, and method of use thereof, will now be described, in accordance with different embodiments of the invention. In general, and as will be exemplified by the specific embodiments described below, the measurement apparatus described herein provides for an evaluation as to the inner dimension of an opening within a body surface, for example, in the context of an assembly wherein one or more components are to be installed within a receiving body in which this opening is defined.

It will be appreciated that the terms "measurement" and "evaluation" are meant to be construed broadly to encompass different levels of precision and exactitude, as well as refer to different levels of qualitative, quantitative and/or relative measurements. For example, where some embodiments may be configured to provide a quantitative measurement, for example via a graduated scaling or index defined with reference to preset scaling units, other embodiments may rather provide indication as to a qualitative and/or relative measurement or evaluation (e.g. relatively or perceptively larger or smaller than a preset dimension or template, within a pre-defined dimensional tolerance or range, and/or other such dimensional assessment techniques).

It will also be appreciated that the term "opening" is to be construed broadly to encompass various opening shapes and sizes generally defined by a peripheral edge that at least partially circumscribes the opening. For instance, in the illustrative embodiment described below, an opening is defined within a curved receiving body surface by a three-dimensional wedge shaped periphery that follows the contour of this surface. In such embodiments, an opening may be effectively characterized as a non-planar opening having a non-linear periphery that at least partially circumscribes this opening in three-dimensional space. That being said, while the below example contemplates an irregular opening having a discontinuous periphery, other embodiments of the herein described invention may readily apply to a more uniform or regular configuration, and that, without departing from the general scope and nature of the present disclosure. Accordingly, the term "opening" is generally defined herein to include reference to a hole, recess, cavity, hollow, aperture or other such formation generally defined with respect to a body surface by an edge or periphery at least partially circumscribing same.

With reference to FIGS. 1 to 3, and in accordance with one embodiment of the invention, an apparatus, generally referred to using the numeral 100, will now be described. In general, the apparatus 100 can be used evaluate an inner dimension of an opening, for example as defined within a body surface by a peripheral edge at least partially circumscribing the opening, such as illustratively depicted by edge 158 of body 154 in FIG. 5. The apparatus 100 generally comprises a base portion 102 configured for reproducible positioning within the opening, and one or more extendable structures, such as extendable elements 104, 106 and 108 representatively identified as dimension indicators 1, 2 and 3. Each of the extendable elements is adjustably extendable from the base 100, in this embodiment in different directions, to provide an indication as to an inner dimension of the opening.

In this particular embodiment the base is defined by a substantially rectangular portion 110 shaped and sized to fit within the opening and providing a handle portion 112 extending outwardly therefrom to facilitate manipulation thereof by a user. Extending from this rectangular portion 110 are distinct extension portions 114 and 116 shaped and oriented to accommodate a general curvature or non-planarity of the opening being considered in this example. Upon these extension portions 114 and 116 are disposed the extendable elements 104, 106, and 108 to adjustably extend outwardly therefrom substantially within an effective contour of the opening (i.e. along an effective continuation of the body surface), to respectively engage different portions of an edge formed within the body surface to define an at least partially circumscribing periphery of the opening. Given the respective adjustment of the extendable elements, an indication as to a dimension of the opening can be ascertained.

For example, and with particular reference to FIG. 4, each adjustable element in this embodiment is comprised of a displaceable body or slide bar 118 shaped and sized to slide within a corresponding windowed casing 120. In this particular embodiment, the body 118 displays a singular marking 122 through the windowed casing 120, which marking 122 is displaceable relative to static graduated markings 124 displayed on either side of the windowed housing 120 such that, upon adjusting a longitudinal position of the body 118, indication is provided by the variable alignment of body and housing markings as to a relative and/or absolute dimension of the opening. In this example, alignment of the displaceable marking 122 with respect to graduated markings 124 provides a quantitative deviation from a preset or design dimension, noted by preset dimension marking 127. It will be appreciated that the graduated and singular markings may be reversed to provide a like effect. Furthermore, as noted above, it will be appreciated that while a graduated scaling is provided in this illustrative embodiment, other methods may be employed within this context to provide similar indications without departing from the general scope and nature of the present disclosure. For example, a relative displacement between a singular marking, and longitudinally distanced markings representative of a dimensional tolerance or range, may also be used to provide a qualitative evaluation of the opening's dimension, as can the relative displacement of two (2) singular markings be used to provide an over/under-type indication. Clearly, an experienced user may also be capable of appreciating relative dimensional variations, particularly in larger scale embodiments, by visual observation of the variation in the extension of the body 118 from one opening to the next, and thus, practice an embodiment of the invention without the need for any particular markings These and other such embodiments will be understood by the skilled artisan to fall within the general scope of the present disclosure.

In this particular embodiment, each of the bodies 118 are fitted with a magnet 126 at an extremity thereof such that, upon positioning the apparatus 100 within a corresponding opening formed within a metallic body (or defined by a metallic/magnetic edge), the magnetized bodies 118 can be adjusted (e.g. via nub 128 protruding through corresponding longitudinal slot 130) to magnetically engage the periphery of the opening and thus provide a hands free indication. This particular embodiment reduces user intervention by facilitating engagement of the slidable bodies 118 within the opening, thus avoiding having the user hold the slidable body 118 in position while noting an extension thereof. In another embodiment (not shown), a slide bar may otherwise or also be spring loaded, or otherwise biased, in its outmost extension. Upon positioning this alternative apparatus within a corresponding opening, a user may either manually adjust each element for engagement within the opening, or again have the spring-loaded bodies shaped (e.g. rounded or beveled) to naturally retract upon insertion into the opening to automatically provide indication as to a dimension of the opening. These and other such alternatives will be readily apparent to the person of ordinary skill in the art, and are therefore meant to fall within the scope of the present disclosure.

With particular reference to FIGS. 3 and 5, the apparatus 100 may further comprise one or more locating elements to facilitate reproducible positioning of the apparatus 100 within a corresponding opening. For example, in this illustrative embodiment, the apparatus 100 comprises 3 locating structures or datum, such as rearwardly projecting nubs 130, 132 and 134 shaped and sized to cooperatively engage corresponding features defined within the opening (e.g. see corresponding holes 136, 138 and 140, respectively, depicted in FIG. 5). This particular embodiment further comprises three magnetized locating structures, namely rounded magnetized nets 142, 144 and 146, shaped and sized to magnetically engage corresponding metallic features defined within the opening (e.g. see corresponding recesses 148, 150 and 152, respectively, depicted in FIG. 5). As will be appreciated by the skilled artisan, different numbers and types of locating elements may be used in different embodiments to provide similar results. For example, while 6 total locating structures are used in this embodiment to reproducibly locate, orient and effectively hold the apparatus 100 in place within the opening during use, more or less features may be exploited in different embodiments to achieve a similar effect. Furthermore, it will be appreciated that while two or more locating elements may facilitate reproducible location and orientation of the apparatus within a corresponding opening, a single element, when adequately shaped and/or when combined with proper engagement of the opening's periphery or the like, may suffice in achieving this result. In yet other embodiments, proper engagement of the apparatus' base 102, or other components thereof, within the opening may effectively act as locating elements to reproducibly position the apparatus 100 within a corresponding opening, without departing from the general scope and nature of the present disclosure. In light of the above, it will be apparent to the skilled artisan that various approaches are available in reproducibly positioning the apparatus within a corresponding opening, the provision of dedicated locating elements as illustrated herein providing only one example of such approaches.

With particular reference to FIGS. 5 to 7, the illustrative embodiment of apparatus 100 is depicted within the context of an assembly, wherein an indication as to the inner dimension of a receiving body (i.e. vehicle body 154) is achieved using this apparatus prior to installation of a corresponding component (i.e. taillight 156) within this receiving body. In this particular embodiment, the apparatus 100 is used for the purpose of evaluating a general fit of the component 156 within the receiving body prior to installation thereof, for example, upstream of the assembly line. This may be beneficial, for example, where a particular vehicle body component undergoes welding or other such assembly, and where a compliance of this assembly's dimensions with preset design specifications (e.g. a predefined fit or snugness tolerance for the downstream installation of a component within the body) is desired before this particular assembly reaches a downstream component installation location along the assembly line. Using this apparatus 100, early detection of a deviation from specification may lead to early assessment and remediation as to the source of such deviation.

In this particular embodiment, the apparatus 100 is used to identify a significant deviation in the gap that will ultimately be defined between a periphery of the taillight opening defined within the vehicle body 154, and the installed taillight 156. To ascertain such deviation, each of the three extendable elements 104, 106 and 108 can be used to ascertain a gap variation from nominal at three distinct locations along the opening's periphery 158 (e.g. see gap identifiers 1, 2 and 3 in FIG. 7). Using the graduated scaling of the extendable elements, an assessment as to whether such predicted gaps fall within a preset gap tolerance can be achieved at one or more upstream locations along the assembly line prior to installation of the component within the receiving body. Clearly, while three gap deviation identifiers are provided in this example, different embodiments may use different numbers and types of identifiers depending on the application at hand. For example, in some embodiments, a single identifier may suffice to provide a sufficiently accurate assessment, whereas in other embodiments, two, three or more identifiers may be used to provide a more granular quality control. Similarly, while each of the extendable elements are shown in this example to extend in different directions along a contour of the receiving body surface and/or opening, some embodiments may also or alternatively include an extendable element disposed so to extend inwardly within the receiving body to provide, for example, an depth identifier useable, in some embodiments, in evaluating a predicted smoothness of the surface interface between the receiving body and component once installed. These and other such examples should be readily apparent to the person of ordinary skill in the art, and are therefore intended to fall within the scope of the present disclosure.

Clearly, the apparatus disclosed herein can be constructed in different sizes and shapes to facilitate installation of different components within or in relation to various different types of receiving bodies, as will be readily appreciated by the skilled artisan. It will be further appreciated that while the above provides an example for the automotive industry, similar apparatus may be contemplated within the scope of the present disclosure for other applications, not necessarily limited to the manufacturing assembly industry, where an indication as to an inner dimension of an opening, such as defined in a receiving body, is required or desired.

While the present disclosure describes various exemplary embodiments, the disclosure is not so limited. To the contrary, the disclosure is intended to cover various modifications and equivalent arrangements included within the spirit and scope of the appended claims. The scope of the following claims is to be accorded the broadest interpretation so as to encompass all such modifications and equivalent structures and functions.

The invention claimed is:

1. An apparatus for evaluating an expected fit of a component prior to installation thereof within an opening in a correspondingly shaped receiving body, with a peripheral edge at least partially circumscribing the opening the apparatus comprising:
    a base structure including one or more locating structures extending from or formed within said base, said locating elements configured for reproducible positive positioning within the receiving body at a corresponding datum location in common with the component; and
    two or more extendable structures adjustably extendable from said base in different directions, each structure having a magnetized remote end portion so as to engage, at least partially under forces generated by the magnet, a corresponding peripheral edge region of the receiving body;
    wherein the datum locations, together with a measured position of the extendable structures, relative to the datum locations provides indication as to the expected fit of the component, when later installed in the receiving body.

2. The apparatus of claim 1, said at least one of said extendable structures adjustable relative to a preset extension representative of a preset gap defined between the component, once installed, and the peripheral edge of the opening.

3. The apparatus of claim 1, the receiving body having a curved body surface having a non-planar opening defined therein by a peripheral edge at least partially circumscribing the opening and running along a contour of the curved surface, said base shaped and sized to reproducibly position at least two of said extendable structures to extend within respective planes of the opening and thereby engage the peripheral edge along the contour.

4. An apparatus for evaluating an expected fit of a component prior to installation thereof within an opening in a correspondingly shaped receiving, with a peripheral edge at least partially circumscribing the opening the apparatus comprising:
- a base structure including one or more locating structures extending from or formed within said base, said locating elements configured for reproducible positive positioning within the receiving body at a corresponding datum location in common with the component; and
- two or more extendable structures adjustably extendable from said base in different directions, each structure having a magnetized remote end portion so as to engage, at least partially under forces generated by the magnet, a corresponding peripheral edge region of the receiving body;
- wherein the datum locations, together with a measured position of the extendable structures, relative to the datum locations provides indication as to the expected fit of the component, when later installed in the receiving body.

5. The apparatus of claim 4, at least one of said extendable structures comprising a static marking and a displaceable marking displaceable relative thereto upon adjustment thereof to provide said indication.

6. The apparatus of claim 5, said static marking representative of a preset dimension, wherein adjustment of said at least one extendable structure provides indication as to a dimension offset of the receiving vehicle body relative to said preset dimension.

7. The apparatus of claim 5, one of said static marking and said displaceable marking comprising a graduated marking.

8. A hand held apparatus for evaluating an expected fit of a vehicle component prior to installation thereof within a correspondingly shaped target region in a vehicle body, with a peripheral edge region at least partially circumscribing the target region, the apparatus comprising:
- a base structure including one or more locating structures extending from or formed within said base, said locating elements configured for reproducible positive positioning within the vehicle body at a corresponding datum location in common with the vehicle component; and
- two or more extendable structures adjustably extendable from said base in different directions, each structure having a magnetized remote end portion so as to engage, at least partially under forces generated by the magnet, a corresponding peripheral edge region of the vehicle body, the extendable structures being adjustable relative to a preset extension representative of a preset gap defined between the vehicle component, once installed, and the peripheral edge region;
- wherein the datum locations, together with measured position of the extendable structures, relative to the datum locations provides indication as to the expected fit of the vehicle component, when later installed in the vehicle body.

9. A method for evaluating an expected fit of a component prior to installation thereof within an opening in a correspondingly shaped receiving body, with a peripheral edge at least partially circumscribing the opening, the method comprising:
- a) locating an apparatus with a base structure including one or more locating structures extending from or formed within the base and configured for reproducible positive positioning within the receiving body at a corresponding datum location in common with the component, and two or more extendable structures adjustably extendable from the base in different directions, each structure having a magnetized remote end portion so as to engage a corresponding peripheral edge region of the receiving body, the extendable structures being adjustable relative to a preset extension representative of a preset gap defined between the component, once installed, and the peripheral edge region of the opening;
- b) orienting the apparatus with each of the locating structures at a corresponding datum location;
- c) orienting each extendable structure to enable the magnetized remote end portion to engage, at least partially under forces generated by the magnet, its corresponding peripheral edge region;
- d) ascertaining an expected fit between the receiving body and a later installed component according to the position of the extendable structures relative to the datum locations; and
- e) advancing the body to a subsequent step according to the ascertained fit.

* * * * *